United States Patent
Lewis et al.

(10) Patent No.: US 8,024,289 B2
(45) Date of Patent: Sep. 20, 2011

(54) SYSTEM AND METHOD FOR EFFICIENTLY PROVIDING CONTENT OVER A THIN CLIENT NETWORK

(75) Inventors: Simon John Lewis, Kent (GB); Jonathan Mark Isherwood Carter, Kent (GB); Marc Stuart Harris, London (GB); Graham Wright, London (GB)

(73) Assignee: Bighand Ltd., London (GB)

( * ) Notice: Subject to any disclaimer, the term of this patent is extended or adjusted under 35 U.S.C. 154(b) by 376 days.

(21) Appl. No.: 12/182,346

(22) Filed: Jul. 30, 2008

(65) Prior Publication Data
US 2009/0037434 A1 Feb. 5, 2009

Related U.S. Application Data

(60) Provisional application No. 60/935,204, filed on Jul. 31, 2007.

(51) Int. Cl.
*G06F 17/30* (2006.01)
(52) U.S. Cl. ........ 707/609; 707/916; 707/959; 709/201; 709/203; 709/217
(58) Field of Classification Search ................. 709/203, 709/231, 201, 217; 705/9; 342/185; 375/240; 707/609, 916, 959
See application file for complete search history.

(56) References Cited

U.S. PATENT DOCUMENTS

| | | | |
|---|---|---|---|
| 5,146,439 A | 9/1992 | Jachmann et al. | |
| 5,898,916 A | 4/1999 | Breslawsky | |
| 6,279,029 B1 * | 8/2001 | Sampat et al. | 709/203 |
| 6,578,007 B1 * | 6/2003 | Howes et al. | 705/9 |
| 7,107,351 B2 * | 9/2006 | Baumeister et al. | 709/231 |
| 2003/0046350 A1 | 3/2003 | Chintalapati et al. | |
| 2003/0210183 A1 * | 11/2003 | Andrusiak et al. | 342/185 |
| 2005/0124383 A1 | 6/2005 | Booth | |
| 2006/0256934 A1 | 11/2006 | Mazor | |
| 2007/0160128 A1 * | 7/2007 | Tian et al. | 375/240 |
| 2007/0174430 A1 * | 7/2007 | Tedman et al. | 709/219 |
| 2008/0236366 A1 * | 10/2008 | Van Os et al. | 84/609 |
| 2009/0077174 A1 * | 3/2009 | Janssen et al. | 709/203 |

FOREIGN PATENT DOCUMENTS

| | | |
|---|---|---|
| CA | 2 365 723 A1 | 6/2002 |
| WO | WO 97/29578 | 8/1997 |
| WO | WO 00/46787 | 8/2000 |
| WO | WO 2006/076389 A2 | 7/2006 |

OTHER PUBLICATIONS

International Preliminary Report on Patentability for PCT/IB2008/001981.

(Continued)

*Primary Examiner* — Frantz Coby
(74) *Attorney, Agent, or Firm* — Drinker Biddle & Reath LLP

(57) ABSTRACT

A system, method and computer readable instructions for controlling streaming audio in real time in a thin client terminal server environment that can be used, for example, to provide support for a digital dictation system. A server runs client software, and at least one terminal runs a driver which communicates with the client software to create a virtual channel over which at least one digital dictation file is transmitted in packetized format between the terminal and the server, such that the client software controls operations performed at the terminal pertaining to the digital dictation file.

20 Claims, 2 Drawing Sheets

OTHER PUBLICATIONS

International Search Report mailed Jul. 8, 2008 in PCT/IB2007/002858 filed Sep. 28, 2007.

International Search Report mailed Jan. 28, 2009 in PCT/IB2008/001981 filed Jul. 30, 2008.

International Search Report mailed Sep. 19, 2008 in PCT/IB2008/001082 filed May 1, 2008.

* cited by examiner

SYSTEM AND METHOD FOR EFFICIENTLY PROVIDING CONTENT OVER A THIN CLIENT NETWORK

This application claims benefit from U.S. Provisional Patent Application No. 60/935,204, filed on Jul. 31, 2007, the entire contents of which being incorporated herein by reference.

BACKGROUND OF THE INVENTION

1. Field of the Invention

The present invention relates to a system and method for efficiently providing content over a thin client network. More particularly, the present invention relates to a system and method for streaming audio in real time in a thin client terminal server environment that can be used, for example, to provide support for a digital dictation system.

2. Description of the Related Art

Thin client computing, as understood in the art, is a system or network in which terminal services and applications, such as typical desktop applications, are installed and run on a terminal server. Therefore, terminals communicating with the server can provide a desktop environment that gives the appearance that the desktop applications are being run on the individual local terminals, even though those application are installed and run on the terminal server.

That is, when an application is being run on the terminal server and accessed by a user via a local terminal, the information generated by the application is sent to the local terminal and thus displayed on the screen of the local terminal. Furthermore, information pertaining to keyboard input and mouse movements made at the local terminal are sent to the terminal server and acted upon by the application being run at the terminal server. A terminal server typically will allow multiple users and applications to be run at the same time, which is a type of IT infrastructure commonly referred to as "server based computing."

The exchange of information between the local terminal and terminal server should be efficient enough to give the appearance to a user that the application is being run at the local terminal. However, as can be appreciated by one skilled in the art, networks can experience various degrees of latency, which is the amount of time (typically measured in milliseconds) that is required for data to cross the network between two computers. High degrees of latency can adversely impact application performance, because the user may experience a perceived delay between the time that the keys are struck or the mouse is moved and the time that the text appears or the cursor moves on the screen. Networks can also experience packet loss which refers to the data packets that are sent from the sending computer and fail to arrive at the intended receiving computer. Also, because data is typically divided into many different packets at the sending computer, it is possible that those data packets can arrive in a different order than that in which they were sent or, in other words, arrive "out of sequence," which can result in errors in the application, the display of information, or both.

Accordingly, it is desirable to provide a system and method for exchanging information between remote terminals and a terminal server in a thin client network that can eliminate or reduce latency, packet loss and out of sequence packet arrivals.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE EMBODIMENTS

Figure 1:
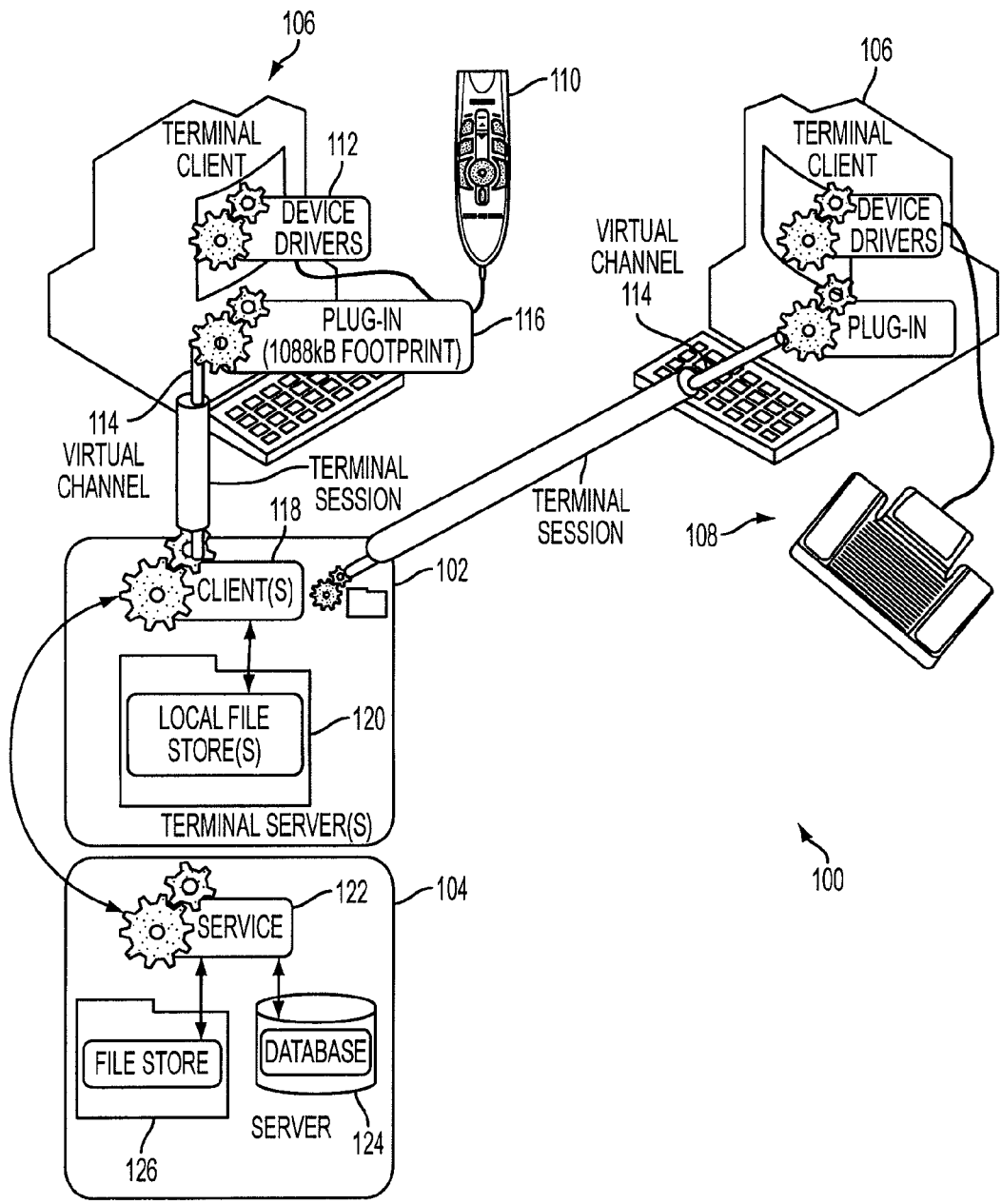
FIG. 1 is a conceptual diagram illustrating an example of a thin client network employing a system and method for providing content, in particular, streaming audio, over a network according to an embodiment of the present invention.

As shown in FIG. 1, a thin client network 100 comprises at least one terminal server 102, a server 104, and a plurality of terminals 106. A terminal 106 can typically include a user interface 108, such as a mouse and keyboard, and can be capable of connecting with one or more other external devices, such as a digital dictation device 110. The example discussed herein will refer to a thin client network 100 that is capable of handling streaming audio and, in particular, digital dictation audio files that can be digitally recorded on the digital dictation device 110 and then streamed to the terminal server 102 in real time or substantially in real time via a terminal 106.

As indicated, a terminal 106 can be a "dumb terminal" having limited functionality, and includes at least one device driver 112 that operates to pass audio data and control information between the terminal 106 and the terminal server 102 over a virtual channel 114 during, for example, a terminal session. That is, the device driver 112 can control packets being sent by the terminal 106 and received by the terminal 106, and ensures that data is not lost, as discussed in more detail below.

A terminal 106 further includes a plug-in 116 that is installed on a terminal 106 and can include, for example, a recorder that can be a .dll file, as well as a .dll file (referred to as "BHCommsProtocol.dll") that is used by the device driver 112 and a codec. The codec can be, for example, a code excited linear prediction (CELP) based codec that can be used during a terminal session. This type of codec can, for example, write the maximum packet size that can be transferred in a terminal session (e.g., 1600 bytes for Microsoft's Remote Desktop Protocol (RDP) and 2044 bytes for Citrix's Independent Computing Architecture (ICA) protocol), thus making the codec as efficient as possible. The plug-in 116 can also perform application optimizations that can further reduce the load on the terminal server 102 and reduce bandwidth consumption. The amount of bandwidth used per terminal session can be, for example, on the average of 20 kilobits per second (kbps). However, if during a session large amounts of data are moved from the terminal server 102 to the terminal 106, such as that which would occur when staring an application such as Word or Excel, bandwidth consumption could reach 100 kbps of data being sent between the terminal 106 and terminal server 102.

In addition to the above components, control device drivers can be installed on the terminal 106 to enable devices such as a "SpeechMike" to be used. Alternatively, a sound card and microphone installed on the terminal 106 can be used. Furthermore, it is noted that the device drivers do not need to be installed on the terminal server 102. Also, capabilities such as USB support depend on the operating system of the terminal 106, not the operating system or protocol used by the terminal server 102.

The terminal server 102 in this example includes at least one client software 118 and at least one local file store 120. In a thin client environment, the majority of the application software, or at least a substantial portion of the application software, is served by the terminal server 102. The server 102 can be, for example, a Windows type terminal server or a Citrix type terminal server, to name a few. However, any suitable type of terminal server 102 can be used.

The server 104 in this example runs software 122, such as an application service, according to an embodiment of the present invention, and can include, for example, a structured query language (SQL) database 124 and file store 126 for storing digital dictation files or transcribed files and any other information as discussed in more detail below. Specifically, dictation files can be created on the dictation devices 110, which are considered part of the "client system", and uploaded via the terminal 106 to the server 102. The server 102 communicates with server 104 that manages the SQL database 124 and file store 126, and which may be housed on the same server 104 or separately.

The following Tables provide examples of criteria of terminal servers 102, server 104, terminals 106 and codec that can be employed in the network 100.

TABLE 1

Minimum Exemplary Terminal Server Configurations

| Operating System | Citrix MetaFrame 1.8 + SP3 | Citrix MetaFrame XP 1.0 + SP1 | Citrix Presentation Server 3.0 | Citrix Presentation Server 4.0 |
|---|---|---|---|---|
| NT4 Terminal server Edition + SP6a | ✓ | ✓ | X | X |
| Windows Server 2000 + SP2 | ✓ | ✓ | ✓ | ✓ |
| Windows Server 2003 | X | ✓ | ✓ | ✓ |

TABLE 2

Minimum Exemplary Terminal Client Criteria

| Protocol | 32-bit client | Web client |
|---|---|---|
| Citrix (ICA) | 6.01.967 or later Tsclient | 6.3 or later tswebsetup |
| Windows (RDP) | | |

TABLE 3

Minimum Exemplary Codec Criteria

| Codec | Compression Type | Audio Format | Bit Rate | File Size |
|---|---|---|---|---|
| TotalSpeech Standard | Fixed | 8 kHz, Mono | 1.1 kbps | 0.8 MB (10 min dictation) |

TABLE 4

Minimum Exemplary Server Criteria To Run Citrix

Assumptions

| | |
|---|---|
| ICA Client | v9.x implementing a Full Desktop |
| Network Infrastructure | |
| Backbone | 1 Gbit |
| Speed to desktop | 100 Mbit |
| Citrix Server Farm | HP ProLiant BL20p Server Blade or equivalent Dual Processor 3.0 GHz or above 4 GB RAM 2 * 36 GB Hard Disk, 10K RPM |

TABLE 4-continued

Minimum Exemplary Server Criteria To Run Citrix

Assumptions

| | |
|---|---|
| Server Operating System | Microsoft Windows Server 2003 + SP1 |
| Citrix | MetaFrame Presentation Server 4.0 |
| Max. Concurrent Users Per Server | 35 |

As can be appreciated by one skilled in the art, the manner in which the digital data is buffered between a terminal 106 and the terminal server 102 can impact the ability of the network 100 to stream the audio data in real time or substantially in real time. That is, depending on the operating characteristics of the terminal server 102, bandwidth availability and network connection, the buffering time for data being processed can be as long as 15 seconds. This level of delay for streaming audio can negatively affect the ability of digital dictation features of the network 100 to function properly.

Figure 2:
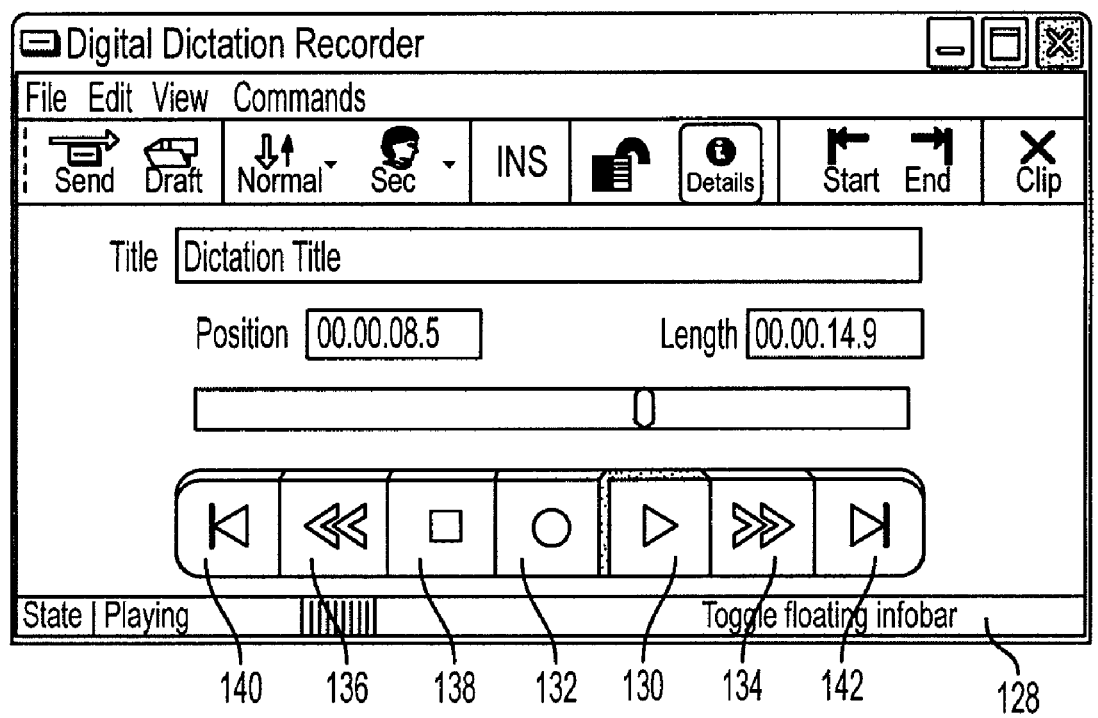
FIG. 2 is a conceptual diagram of a recorder/playback window that can be displayed by a terminal in the network as shown in FIG. 1.

For example, when handling digital dictation files, the terminal 106 can operate in conjunction with the terminal server 102 and server 104 to display on the terminal's display screen a recorder/playback window 128 as shown, for example, in FIG. 2. The recorder/playback window 112 can include buttons, such as play 130, record 132, fast forward 134, rewind 136, stop 138, go to beginning 140 and go to end 142, as indicated, to manipulate the recorded dictation file in a desired manner, for example, to record a dictation file or to listen to and edit portions of the recorded dictation file.

However, if there is a significant buffering delay, the position in the dictation file indicated by indicator 144 can be inaccurate. For instance, the position being shown as the current position could be 15 seconds ahead of what the user is actually hearing. Also, the sound may not stop when the user makes the request to stop by clicking on the stop button 138, either during recording or play back. That is, although the terminal server 102 may have processed the stop request, the buffer continues to be emptied to the terminal 106 and therefore the user may continue to hear sound for up to 15 seconds after he or she clicked on the stop button 138. Accordingly, latency caused, for example, by buffering, as well as other issues such as packet loss and out of sequence packets can impact the reliability and quality of the digital dictation operations.

To allow for efficient streaming of audio data in, for example, a digital dictation type environment, the client software 118 in this example includes a recorder/playback module that can work with, for example, Citrix's Independent Computing Architecture (ICA) protocol and Microsoft's Remote Desktop Protocol (RDP), to name a few. In this example, the recorder/playback module is divided into four separate components, namely, a file manager, a digital filter, a sound device and an ActiveX control, which are each responsible for specific functions.

According to this embodiment, the file manager reads the physical file (.bhf) and holds a 15 second (or about a 15 second) buffer of sound data when playing sound, and writes to the physical file (.bhf) asynchronously when recording. The digital filter re-samples the sound to allow playback speed variation and provide tone control. The sound device manages the sound device (e.g., the "SpeechMike") and provides Voice Operated Recording (VOR). The ActiveX control provides the recorder/playback window 128 as shown, for example, in FIG. 2.

As can be appreciated by one skilled in the art, the file manager, digital filter and sound device components can be connected together to form a flow stream. When recording, the audio data can be pushed from the sound device through the digital filter, which in turn pushes the audio data to the file manager that writes the audio data to, for example, the local file store (e.g., a disk) on the terminal server 102. Similarly, when playing audio, the audio data is pushed from the file manager through the digital filter, which in turn pushes the audio data to the sound device where the audio data is played. These pushing operations, as well as the operation and arrangement of the file manager, a digital filter, and sound device components, enables the network 100 to stream audio data efficiently in real time or substantially in real time and with instant stop/start control during a terminal session. In addition, when audio data is sent between the file manager and sound device interfaces in the recorder/playback module, the file manager and sound device interfaces are unaware that the application for the recorder/playback module is distributed across physically separate hardware and that they file manager and sound device interfaces are actually communicating through the BHCommsProtocol.dll over the virtual channel 114.

Accordingly, the client software 118 is efficient in terms of additional network overhead required per user and also has a significantly lower impact on sever CPU resources when compared to, for example, a Citrix application. The generated audio files are also of high quality and therefore easier to transcribe. In addition, the client software 118 has backwards compatibility with older versions of Citrix, and can support Windows Terminal Services. Also, application and codec optimizations such as those discussed above can dramatically reduce load on the network 100 and server 102 and 104, and provide support a wider range of recording/playback devices including, for example, those manufactured by Philips, Olympus and Grundig, to name a few.

Although only a few exemplary embodiments of the present invention have been described in detail above, those skilled in the art will readily appreciate that many modifications are possible in the exemplary embodiments without materially departing from the novel teachings and advantages of this invention. For example, the order and functionality of the steps shown in the processes may be modified in some respects without departing from the spirit of the present invention. Accordingly, all such modifications are intended to be included within the scope of this invention.

What is claimed is:

1. A system for handling digital dictation in a thin client environment, comprising:
   at least one server running at least one client software;
   at least one terminal server; and
   at least one terminal running at least one driver which communicates with the client software to create a virtual channel over which at least one digital dictation file is transmitted in packetized format between the terminal and the server, such that the client software controls operations performed at the terminal pertaining to the digital dictation file,
   wherein packetizing the digital dictation file for transmission includes capturing, from a recording device or a file manager, portions of the digital dictation file, compressing the individual portions, splitting the compressed portions into packets of a size suitable for transmission over the virtual channel, transmitting the packets via the virtual channel to the at least one terminal server or the at least one terminal, and
   wherein, on arrival at the terminal server or the at least one terminal, the packets are reassembled into the original compressed portions to be written to a hard drive in the terminal server or to be played through an audio device in the terminal.

2. A system as claimed in claim 1, wherein:
   the client software further operating to store and retrieve the digital dictation file to and from a file store associated with the server.

3. A system as claimed in claim 1, wherein:
   the client software controls the operations performed at the terminal using pushing operations to stream the packetized digital dictation file between the server and the terminal.

4. A system as claimed in claim 1, wherein:
   the client software includes at least one of a file manager, a filter, a sound device and an ActiveX control, and the client software transfers the packetized data between selected ones of the file manager, filter, sound device and ActiveX control using pushing operations.

5. A system as claimed in claim 1, wherein:
   the operations include at least one of the following: recording the digital dictation file and controlling playback of the digital dictation file.

6. A system as claimed in claim 1, further comprising:
   at least one additional server, running at least one application service, which communicates with the client software to store and retrieve the digital dictation file to and from a file store.

7. A system as claimed in claim 1, further comprising:
   a plurality of the terminals, each running a respective said at least one driver which communicates with the client software to create a respective said virtual channel over which a respective said at least one digital dictation file is transmitted in packetized format between the respective terminal and the server, such that the client software controls operations performed at the respective terminal pertaining to the respective digital dictation file.

8. A method for handling digital dictation in a thin client environment, the method comprising:
   running at least one client software on at least one server;
   running at least one driver on at least one terminal to communicate with the client software to create a virtual channel over which at least one digital dictation file is transmitted in packetized format between the terminal and the server; and
   operating the client software to control operations performed at the terminal pertaining to the digital dictation file,
   wherein packetizing the digital dictation file for transmission includes capturing, from a recording device or a file manager, portions of the digital dictation file, compressing the individual portions, splitting the compressed portions into packets of a size suitable for transmission over the virtual channel, transmitting the packets via the virtual channel to the at least one terminal server or the at least one terminal, and
   wherein, on arrival at the terminal server or the at least one terminal, the packets are reassembled into the original compressed portions to be written to a hard drive in the terminal server or to be played through an audio device in the terminal.

9. A method as claimed in claim 8, further comprising:
   operating the client software to store and retrieve the digital dictation file to and from a file store associated with the server.

10. A method as claimed in claim 8, wherein:
    operating the client software to control the operations performed at the terminal using pushing operations to stream the packetized digital dictation file between the server and the terminal.

11. A method as claimed in claim 8, wherein:
the client software includes at least one of a file manager, a filter, a sound device and an ActiveX control; and
the operating step includes transferring the packetized data between selected ones of the file manager, filter, sound device and ActiveX control using pushing operations.

12. A method as claimed in claim 8, wherein:
the operations include at least one of the following: recording the digital dictation file and controlling playback of the digital dictation file.

13. A method as claimed in claim 8, further comprising:
running at least one application service on at least one additional server to communicate with the client software to store and retrieve the digital dictation file to and from a file store.

14. A method as claimed in claim 8, wherein:
the step of running at least one driver on at least one terminal comprises:
running a respective said at least one driver on each of a plurality of said terminals to communicate with the client software to create a respective said virtual channel between each of the respective terminals and the server; and
transmitting said respective digital dictation file in packetized format over the respective virtual channels between the respective terminal and the server; and
the operating step comprises operating the client software to control respective operations performed at the respective terminals pertaining to the respective digital dictation files.

15. A computer-readable medium encoded with instructions for controlling at least one server to communicate with at least one terminal to handle digital dictation in a thin client environment, the computer readable medium of instructions comprising:
client software for controlling said at least one server to communicate with at least one driver running on at least one terminal to create a virtual channel, to control transmission of at least one digital dictation file in packetized format over the virtual channel between the terminal and the server, and to control operations performed at the terminal pertaining to the digital dictation file,
wherein packetizing the digital dictation file for transmission includes capturing, from a recording device or a file manager, portions of the digital dictation file, compressing the individual portions, splitting the compressed portions into packets of a size suitable for transmission over the virtual channel, transmitting the packets via the virtual channel to the at least one terminal server or the at least one terminal, and
wherein, on arrival at the terminal server or the at least one terminal, the packets are reassembled into the original compressed portions to be written to a hard drive in the terminal server or to be played through an audio device in the terminal.

16. A computer-readable medium of instructions as claimed in claim 15, wherein:
the client software further controls the server to store and retrieve the digital dictation file to and from a file store associated with the server.

17. A computer-readable medium of instructions as claimed in claim 15, wherein:
the client software controls the operations performed at the terminal using pushing operations to control streaming of the packetized digital dictation file between the server and the terminal.

18. A computer-readable medium of instructions as claimed in claim 15, wherein:
the client software includes at least one of a file manager, a filter, a sound device and an ActiveX control; and
the client software controls the server to transfer the packetized data between selected ones of the file manager, filter, sound device and ActiveX control using pushing operations.

19. A computer-readable medium of instructions as claimed in claim 15, wherein:
the operations include at least one of the following: recording the digital dictation file and controlling playback of the digital dictation file.

20. A computer-readable medium of instructions as claimed in claim 15, further comprising:
at least one application service for controlling at least one additional server to communicate with the client software to store and retrieve the digital dictation file to and from a file store.

* * * * *